United States Patent
Attar et al.

(10) Patent No.: US 11,902,124 B2
(45) Date of Patent: *Feb. 13, 2024

(54) ROUND TRIP TIME (RTT) MEASUREMENT BASED UPON SEQUENCE NUMBER

(71) Applicant: Cisco Technology, Inc., San Jose, CA (US)

(72) Inventors: Mohammadreza Attar, Cambridge, MA (US); Navindra Yadav, Cupertino, CA (US); Abhishek Ranjan Singh, Pleasanton, CA (US); Vimalkumar Jeyakumar, Los Altos, CA (US); Shashidhar Gandham, Fremont, CA (US); Roberto Fernando Spadaro, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,091

(22) Filed: Nov. 22, 2022

(65) Prior Publication Data
US 2023/0079606 A1 Mar. 16, 2023

Related U.S. Application Data

(63) Continuation of application No. 17/238,193, filed on Apr. 22, 2021, now Pat. No. 11,516,098, which is a (Continued)

(51) Int. Cl.
*H04L 43/045* (2022.01)
*G06F 3/0482* (2013.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ..... H04L 43/045; H04L 1/242; H04L 9/0866; H04L 9/3239; H04L 9/3242;
(Continued)

(56) References Cited

U.S. PATENT DOCUMENTS 6,338,131 B1 * 1/2002 Dillon ..................... H04L 47/10
712/201
7,327,735 B2 * 2/2008 Robotham ............ H04L 1/1809
370/352

(Continued)

FOREIGN PATENT DOCUMENTS

EP 3793166 A1 1/2023

OTHER PUBLICATIONS

Thomas Sandhom; "MapReduce Optimization Using Regulated Dynamic Prioritization", ACM 2009; pp. 299-310.

*Primary Examiner* — Harry H Kim
(74) *Attorney, Agent, or Firm* — Polsinelli P.C.

(57) ABSTRACT

Systems, methods, and computer-readable media are provided for determining a packet's round trip time (RTT) in a network. A system can receive information of a packet sent by a component of the network and further determine an expected acknowledgement (ACK) sequence number associated with the packet based upon received information of the packet. The system can receive information of a subsequent packet received by the component and determine an ACK sequence number and a receiving time of the subsequent packet. In response to determining that the ACK sequence number of the subsequent TCP packet matches the expected ACK sequence number, the system can determine a round trip time (RTT) of the packet based upon the received information of the packet and the received information of the subsequent packet.

20 Claims, 7 Drawing Sheets

Related U.S. Application Data continuation of application No. 16/173,400, filed on Oct. 29, 2018, now Pat. No. 11,128,552, which is a continuation of application No. 15/170,837, filed on Jun. 1, 2016, now Pat. No. 10,116,531.

(60) Provisional application No. 62/171,899, filed on Jun. 5, 2015.

(51) Int. Cl.

| | | |
|---|---|---|
| G06F 3/04842 | (2022.01) | |
| G06F 3/04847 | (2022.01) | |
| G06F 9/455 | (2018.01) | |
| G06F 16/11 | (2019.01) | |
| G06F 16/13 | (2019.01) | |
| G06F 16/17 | (2019.01) | |
| G06F 16/16 | (2019.01) | |
| G06F 16/23 | (2019.01) | |
| G06F 16/174 | (2019.01) | |
| H04L 9/40 | (2022.01) | |
| G06N 20/00 | (2019.01) | |
| G06F 21/55 | (2013.01) | |
| G06F 21/56 | (2013.01) | |
| G06F 16/28 | (2019.01) | |
| G06F 16/2457 | (2019.01) | |
| G06F 16/248 | (2019.01) | |
| G06F 16/29 | (2019.01) | |
| G06F 16/9535 | (2019.01) | |
| G06N 99/00 | (2019.01) | |
| H04L 9/32 | (2006.01) | |
| H04L 41/0668 | (2022.01) | |
| H04L 43/0805 | (2022.01) | |
| H04L 43/0811 | (2022.01) | |
| H04L 43/0852 | (2022.01) | |
| H04L 43/106 | (2022.01) | |
| H04L 45/00 | (2022.01) | |
| H04L 45/50 | (2022.01) | |
| H04L 67/12 | (2022.01) | |
| H04L 43/026 | (2022.01) | |
| H04L 61/5007 | (2022.01) | |
| H04L 67/01 | (2022.01) | |
| H04L 67/51 | (2022.01) | |
| H04L 67/75 | (2022.01) | |
| H04L 67/1001 | (2022.01) | |
| H04W 72/54 | (2023.01) | |
| H04L 43/062 | (2022.01) | |
| H04L 43/10 | (2022.01) | |
| H04L 47/2441 | (2022.01) | |
| H04L 41/0893 | (2022.01) | |
| H04L 43/08 | (2022.01) | |
| H04L 43/04 | (2022.01) | |
| H04W 84/18 | (2009.01) | |
| H04L 7/10 | (2006.01) | |
| H04L 41/046 | (2022.01) | |
| H04L 43/0876 | (2022.01) | |
| H04L 41/12 | (2022.01) | |
| H04L 41/16 | (2022.01) | |
| H04L 41/0816 | (2022.01) | |
| G06F 21/53 | (2013.01) | |
| H04L 41/22 | (2022.01) | |
| H04L 41/0803 | (2022.01) | |
| H04L 43/0829 | (2022.01) | |
| H04L 43/16 | (2022.01) | |
| H04L 1/24 | (2006.01) | |
| H04L 9/08 | (2006.01) | |
| H04J 3/06 | (2006.01) | |
| H04J 3/14 | (2006.01) | |
| H04L 47/20 | (2022.01) | |
| H04L 47/32 | (2022.01) | |
| H04L 43/0864 | (2022.01) | |
| H04L 47/11 | (2022.01) | |
| H04L 69/22 | (2022.01) | |
| H04L 45/74 | (2022.01) | |
| H04L 47/2483 | (2022.01) | |
| H04L 43/0882 | (2022.01) | |
| H04L 41/0806 | (2022.01) | |
| H04L 43/0888 | (2022.01) | |
| H04L 43/12 | (2022.01) | |
| H04L 47/31 | (2022.01) | |
| G06T 11/20 | (2006.01) | |
| H04L 43/02 | (2022.01) | |
| H04L 47/28 | (2022.01) | |
| H04L 69/16 | (2022.01) | |
| H04L 45/302 | (2022.01) | |
| H04L 67/50 | (2022.01) | |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/235* (2019.01); *G06F 16/2322* (2019.01); *G06F 16/2365* (2019.01); *G06F 16/248* (2019.01); *G06F 16/24578* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/556* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 7/10* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/026* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/5007* (2022.05); *H04L 63/0227* (2013.01); *H04L*

63/0263 (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/01* (2022.05); *H04L 67/1001* (2022.05); *H04L 67/12* (2013.01); *H04L 67/51* (2022.05); *H04L 67/75* (2022.05); *H04L 69/16* (2013.01); *H04L 69/22* (2013.01); *H04W 72/54* (2023.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/535* (2022.05)

(58) Field of Classification Search
CPC .............. H04L 41/046; H04L 41/0668; H04L 41/0803; H04L 41/0806; H04L 41/0816; H04L 41/0893; H04L 41/12; H04L 41/16; H04L 41/22; H04L 43/02; H04L 43/026; H04L 43/04; H04L 43/062; H04L 43/08; H04L 43/0805; H04L 43/0811; H04L 43/0829; H04L 43/0841; H04L 43/0858; H04L 43/0864; H04L 43/0876; H04L 43/0882; H04L 43/0888; H04L 43/10; H04L 43/106; H04L 43/12; H04L 43/16; H04L 45/306; H04L 45/38; H04L 45/46; H04L 45/507; H04L 45/66; H04L 45/74; H04L 47/11; H04L 47/20; H04L 47/2441; H04L 47/2483; H04L 47/28; H04L 47/31; H04L 47/32; H04L 61/5007; H04L 63/0227; H04L 63/0263; H04L 63/06; H04L 63/0876; H04L 63/1408; H04L 63/1416; H04L 63/1425; H04L 63/1433; H04L 63/1441; H04L 63/145; H04L 63/1458; H04L 63/1466; H04L 63/16; H04L 63/20; H04L 67/01; H04L 67/10; H04L 67/1001; H04L 67/12; H04L 67/51; H04L 67/75; H04L 69/16; H04L 69/22; H04L 67/535; H04L 41/0894; H04L 41/40; H04L 43/20; G06F 3/0482; G06F 3/04842; G06F 3/04847; G06F 9/45558; G06F 16/122; G06F 16/137; G06F 16/162; G06F 16/17; G06F 16/173; G06F 16/174; G06F 16/1744; G06F 16/1748; G06F 16/2322; G06F 16/235; G06F 16/2365; G06F 16/24578; G06F 16/248; G06F 16/285; G06F 16/288; G06F 16/29; G06F 16/9535; G06F 21/53; G06F 21/552; G06F 21/556; G06F 21/566; G06F 2009/4557; G06F 2009/45587; G06F 2009/45591; G06F 2009/45595; G06F 2221/033; G06F 2221/2101; G06F 2221/2105; G06F 2221/2111; G06F 2221/2115; G06F 2221/2145; G06N 20/00; G06N 99/00; G06T 11/206; H04J 3/0661; H04J 3/14; H04W 72/54; H04W 84/18

See application file for complete search history.

(56) References Cited

U.S. PATENT DOCUMENTS

| | | | |
|---|---|---|---|
| 7,453,879 B1 * | 11/2008 | Lo | ............... H04L 47/193 370/394 |
| 8,181,253 B1 | 5/2012 | Zaitsev et al. | |
| 3,565,109 A1 | 10/2013 | Poovendran et al. | |
| 3,578,491 A1 | 11/2013 | McNamee et al. | |
| 8,832,013 B1 | 9/2014 | Adams et al. | |
| 9,141,914 B2 | 9/2015 | Viswanathan et al. | |
| 9,621,575 B1 | 4/2017 | Jalan et al. | |
| 10,116,531 B2 | 10/2018 | Alizadeh Attar et al. | |
| 10,749,890 B1 | 8/2020 | Aloisio et al. | |
| 10,944,683 B1 | 3/2021 | Roskind | |
| 11,516,098 B2 * | 11/2022 | Attar | ............... G06F 21/552 |
| 2002/0107857 A1 | 8/2002 | Teraslinna | |
| 2005/0154625 A1 | 7/2005 | Chua et al. | |
| 2005/0185621 A1 | 8/2005 | Sivakumar et al. | |
| 2006/0156408 A1 | 7/2006 | Himberger et al. | |
| 2007/0201474 A1 | 8/2007 | Isobe | |
| 2008/0056124 A1 | 3/2008 | Nanda et al. | |
| 2009/0323543 A1 | 12/2009 | Shimakura | |
| 2014/0173723 A1 | 6/2014 | Singla et al. | |
| 2014/0286174 A1 | 9/2014 | Izuka et al. | |
| 2015/0043351 A1 | 2/2015 | Ohkawa et al. | |
| 2015/0281277 A1 | 10/2015 | May et al. | |
| 2016/0285730 A1 | 9/2016 | Ohkawa et al. | |
| 2017/0324518 A1 | 11/2017 | Meng et al. | |
| 2018/0191617 A1 * | 7/2018 | Caulfield | ............... H04L 47/11 |

* cited by examiner

ROUND TRIP TIME (RTT) MEASUREMENT BASED UPON SEQUENCE NUMBER

CROSS-REFERENCE TO RELATED APPLICATIONS

This application is a continuation of U.S. patent application Ser. No. 17/238,193, filed on Apr. 22, 2021, which in turn, is a continuation of U.S. patent application Ser. No. 16/173,400, filed Oct. 29, 2018, now granted U.S. Pat. No. 11,128,552, which in turn, is a continuation of U.S. application Ser. No. 15/170,837, filed Jun. 1, 2016, now granted U.S. Pat. No. 10,116,531, which in turn, claims the benefit of U.S. Patent Application No. 62/171,899, filed Jun. 5, 2015, the disclosures of which are incorporated herein by reference in their entireties.

TECHNICAL FIELD

The present technology pertains to network analytics, and more specifically to analyzing network flows in a network environment.

BACKGROUND

Conventionally, processes running on a node can calculate a packet's round trip time (RTT) by measuring a starting time when the packet is sent by the node and an ACK time when an acknowledgment is received by the node. However, such measurement mechanism requires the processes be installed on a node that either sends or receives the packet.

Thus, there is a need to determine a packet's RTT without installing software on sending or receiving nodes.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof, which are illustrated in the appended drawings. Understanding that these drawings depict only exemplary examples of the disclosure and are not therefore to be considered to be limiting of its scope, the principles herein are described and explained with additional specificity and detail through the use of the accompanying drawings in which.

DESCRIPTION OF EXAMPLES

Figure 1:
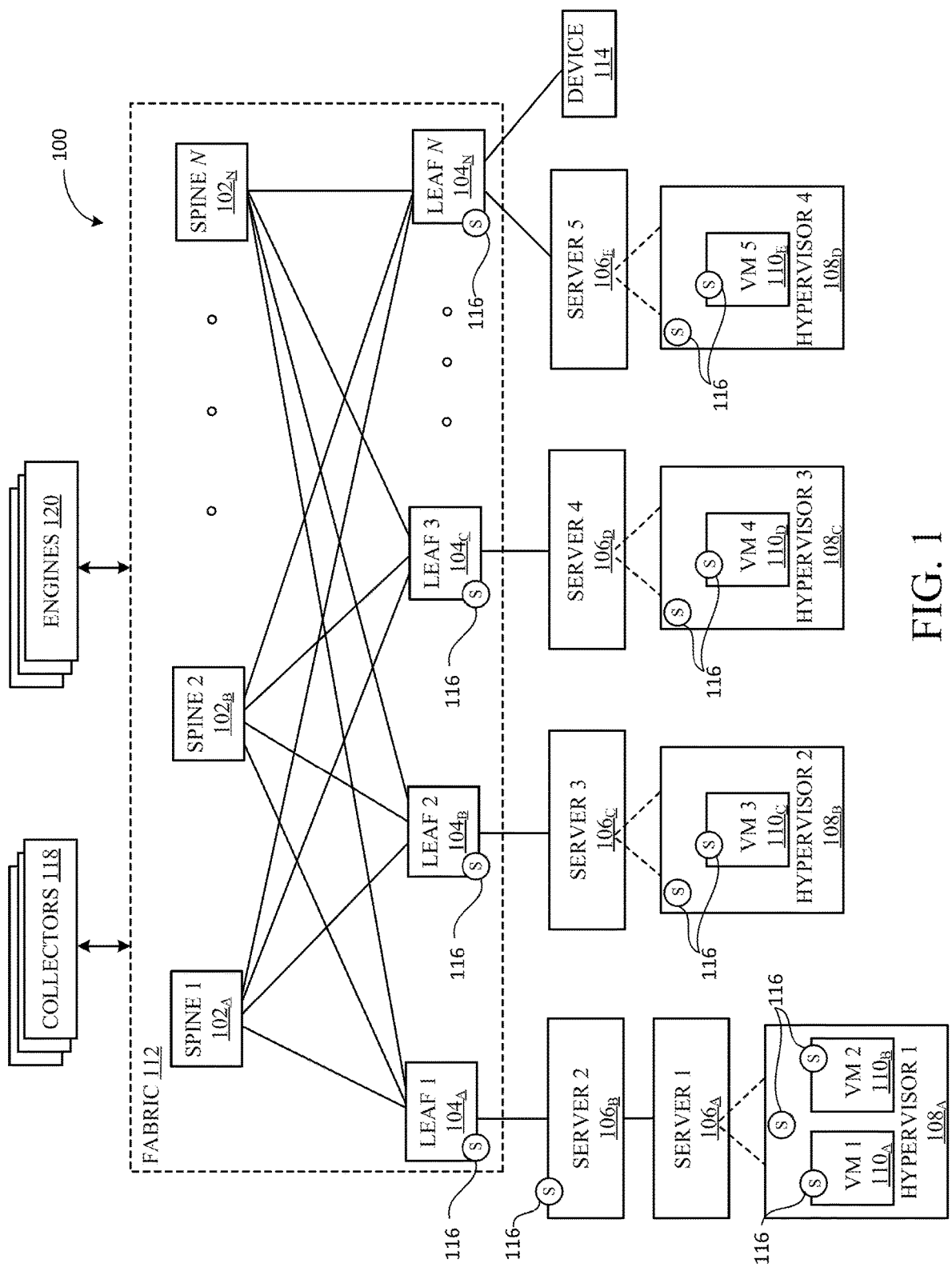
FIG. 1 illustrates a diagram of an example network environment, according to some examples.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to deploy sensors in a network environment, sense network flows, and analyze data packets reported from the sensors to monitor and troubleshoot the network. Sensors can be placed at various devices or components (e.g., sensors located at virtual machines (VMs), hypervisors, and physical switches) in the network to sense network-flow information, such as information of a transmission control protocol (TCP) packet sent by a component of the network. Sensed information of the TCP packet can be analyzed to determine an expected acknowledgement (ACK) sequence number associated with the packet. Information of a subsequent TCP packet received by the component of the network can be sensed and used to determine an ACK sequence number and a receiving time that the subsequent packet was received by the component. In response to determining that the ACK sequence number of the subsequent TCP packet matches the expected ACK sequence number, a round trip time (RTT) of the TCP packet can be determined based upon the sensed information of the TCP packet and the sensed information of the subsequent TCP packet.

In some examples, sensed information of a TCP packet sent by a component of the network can be used to determine a sending time, a packet sequence number and a packet size of the packet. An expected ACK sequence number associated with the TCP packet can be determined based upon the sequence number and the packet size of the TCP packet.

In some examples, if the ACK sequence number of the subsequent TCP packet doesn't match an expected ACK sequence number, the subsequent TCP packet can be ignored. Information of a following TCP packet received by the component of the network can be sensed and used to determine an ACK sequence number and a receiving time that the following packet was received by the component. In response to determining that the ACK sequence number of the following TCP packet matches the expected ACK sequence number, a round trip time (RTT) of the TCP packet can be determined based upon the sensed information of the TCP packet and the sensed information of the following TCP packet.

In some examples, in response to determining that ACK sequence numbers of a series of subsequent TCP packets received by the component of the network doesn't match an expected ACK sequence number, a warning report can be generated to indicate a potentially malicious attack.

In some examples, TCP packets may account for a substantial portion of traffic flows of a network. RTTs of the TCP packets can be used to determine a congestion level of the network. In some examples, information of TCP hand-shakes (i.e., three-way hand-shakes or four-way hand-shakes) in the network can be sensed and reported by a plurality of sensors in the network. Information of TCP hand-shakes within a specific time period can be analyzed to determine a number of re-transmission TCP packets and new TCP packets during the time period and a number of non-duplicative packets associated with the TCP hand-shakes. The number of re-transmission TCP packets and new TCP packets, together with the number of non-duplicative packets, can be used to determine a packet loss rate of the network during the specific time period. The packet loss rate may indicate a degradation level of the network.

In some examples, TCP packets in the network can be sampled every $n^{th}$ packet to save network flow bandwidth and processing power of network-flow-analysis tools. Instead of counting TCP packets to determine a $n^{th}$ TCP packet, a network analysis system may select a specific range of TCP sequence numbers that is $1/n^{th}$ of the entire range of TCP sequence numbers (i.e., 0 to $2^{32}$), and monitor TCP packets that have sequence numbers within the specific range. For example, as the number, n, increases, the specific range of TCP sequence numbers gets narrower, which results in a lower sampling rate of TCP packets in the network. As the number, n, decreases and the specific range of TCP sequence numbers gets wider, the sampling rate of TCP packets in the network goes higher.

DETAILED DESCRIPTION

Figure 2A:
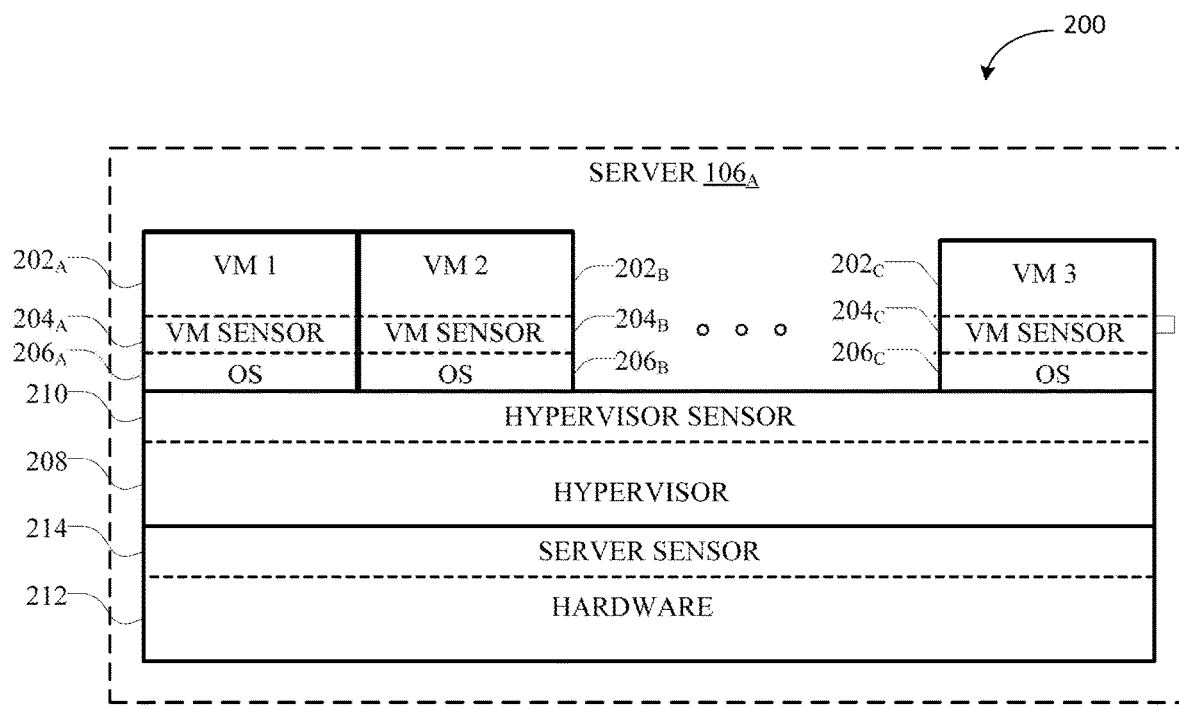
FIG. 2A illustrates a schematic diagram of an example sensor deployment in a virtualized environment, according to some examples.
Figure 2B:
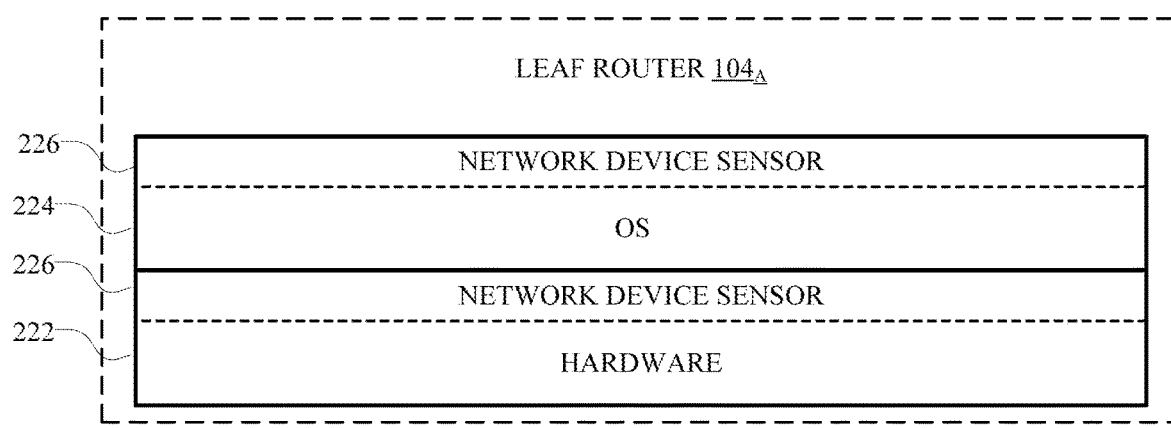
FIG. 2B illustrates a schematic diagram of an example sensor deployment in an example network device, according to some examples.
Figure 2C:
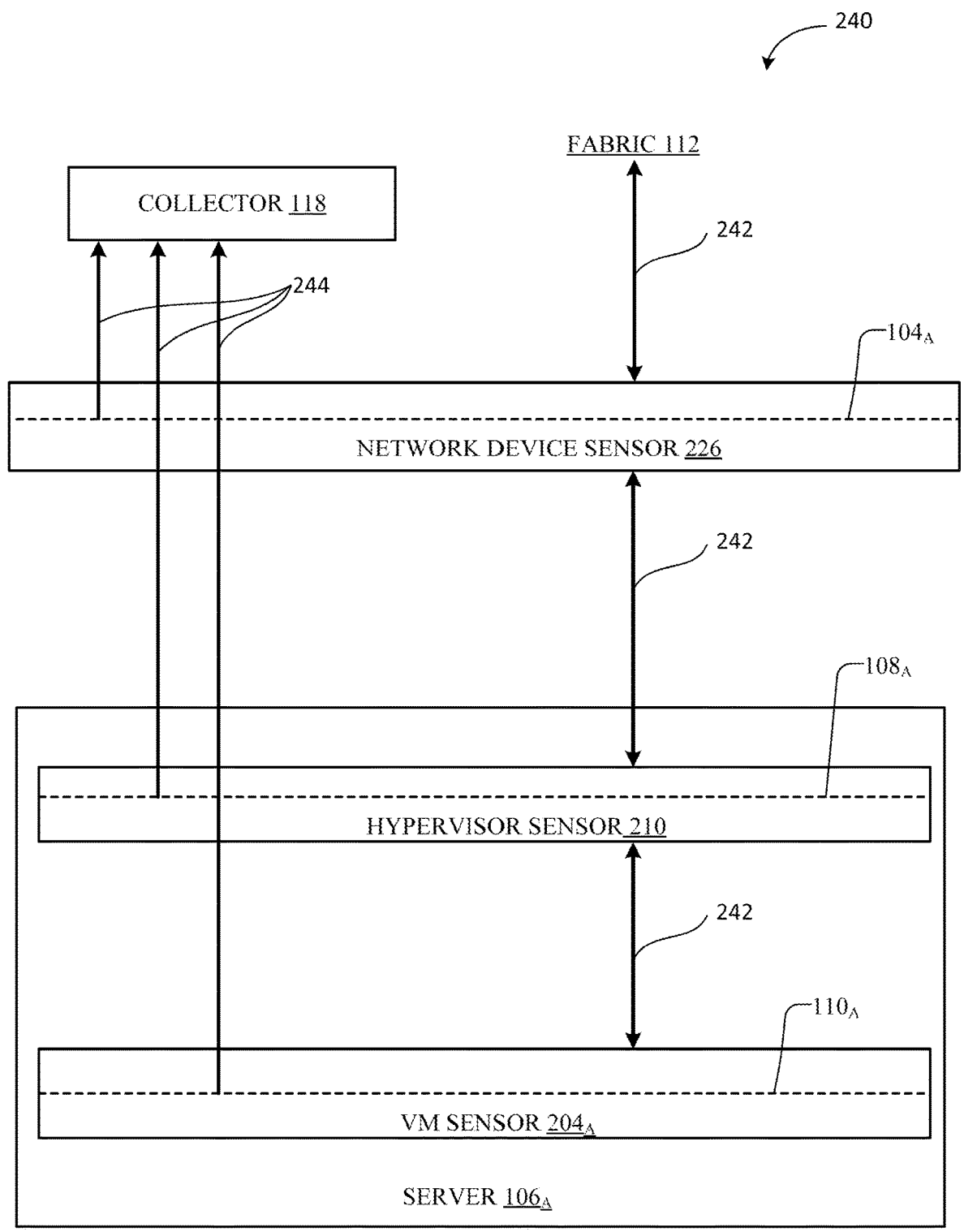
FIG. 2C illustrates a schematic diagram of an example reporting system in an example sensor topology, according to some examples.
Figure 3:
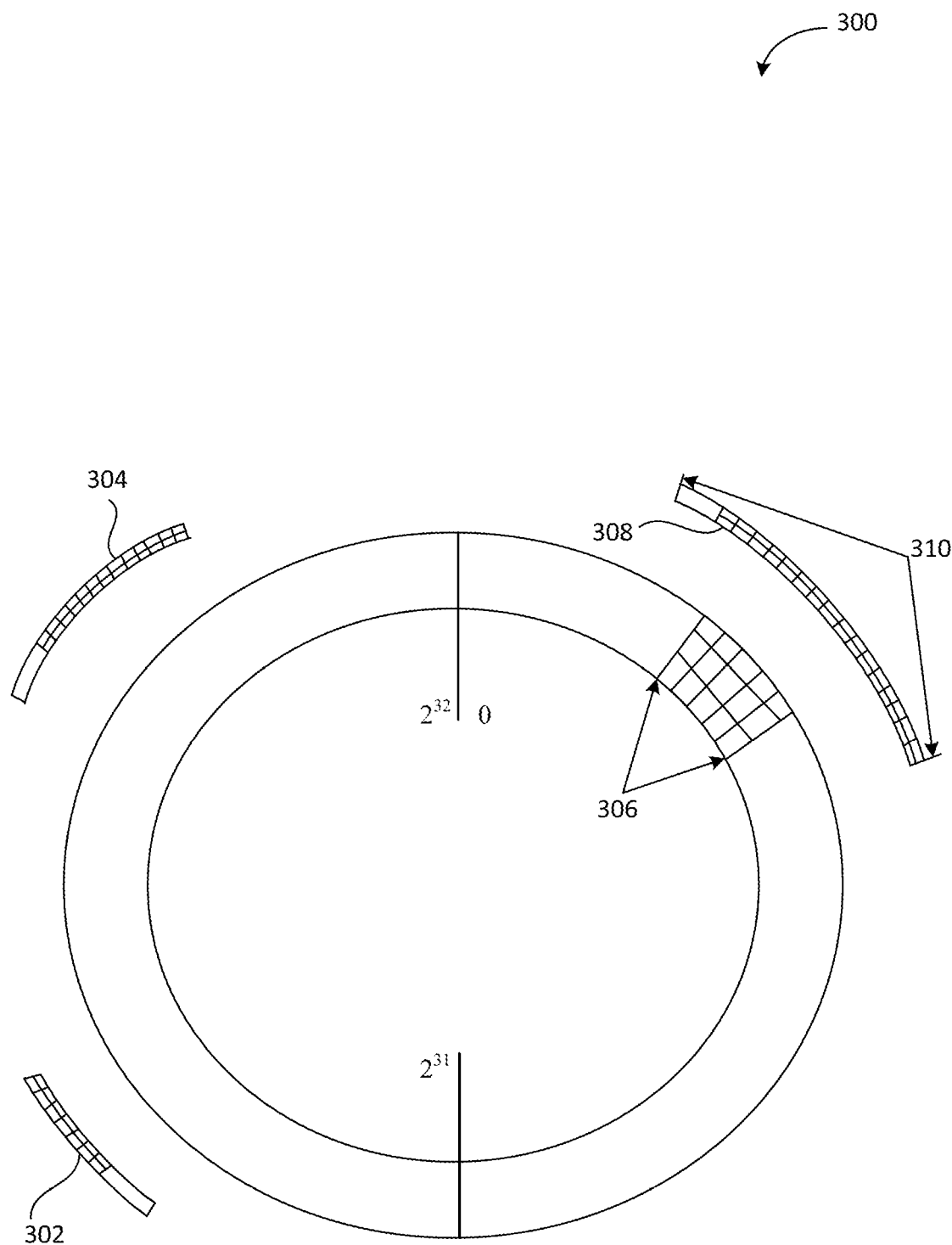
FIG. 3 illustrates a schematic diagram of selectively monitoring a specific range of transmission control protocol (TCP) sequence numbers, according to some examples.
Figure 4:
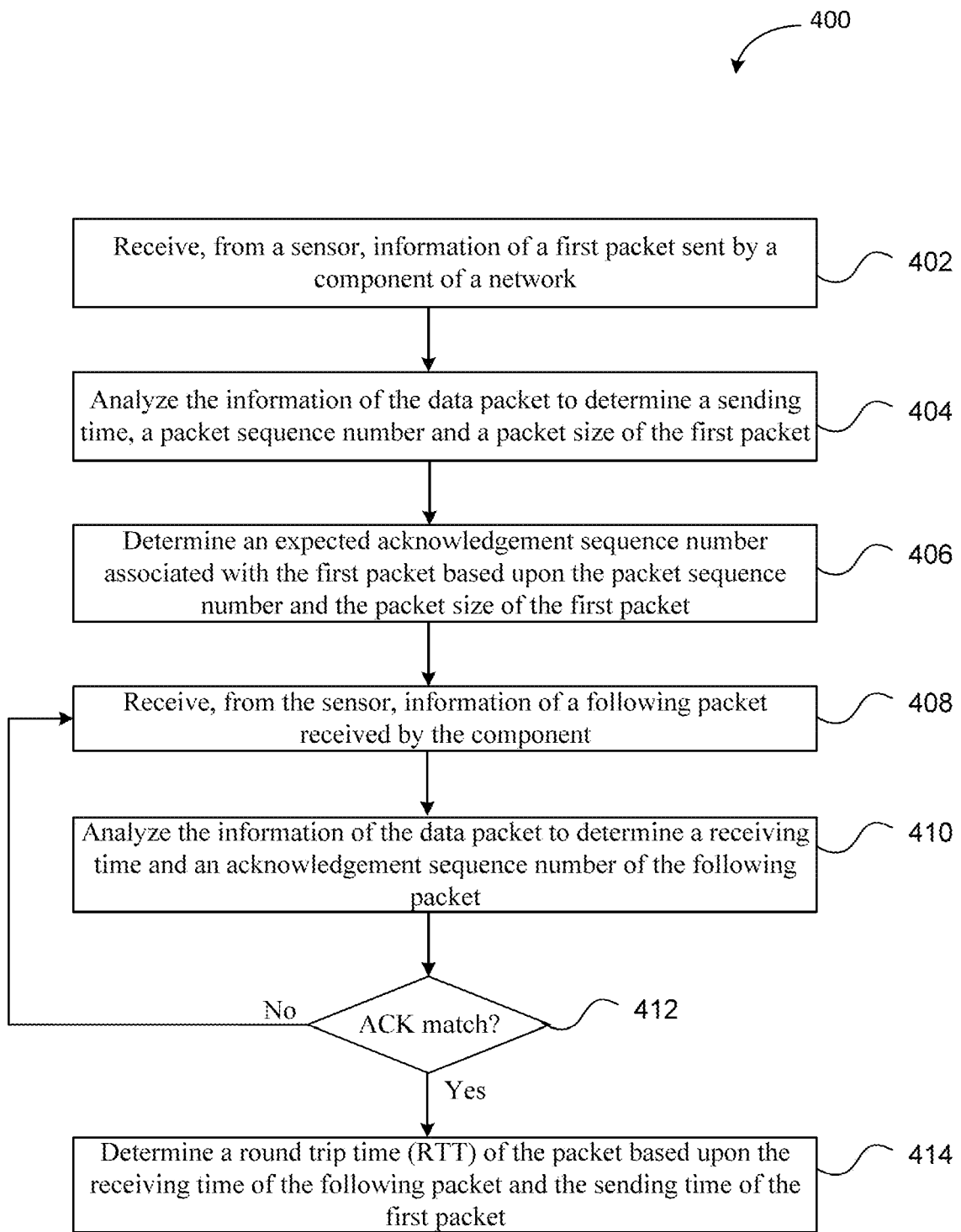
FIG. 4 illustrates an example method for determining a packet's round trip time, according to some examples.
Figure 5:
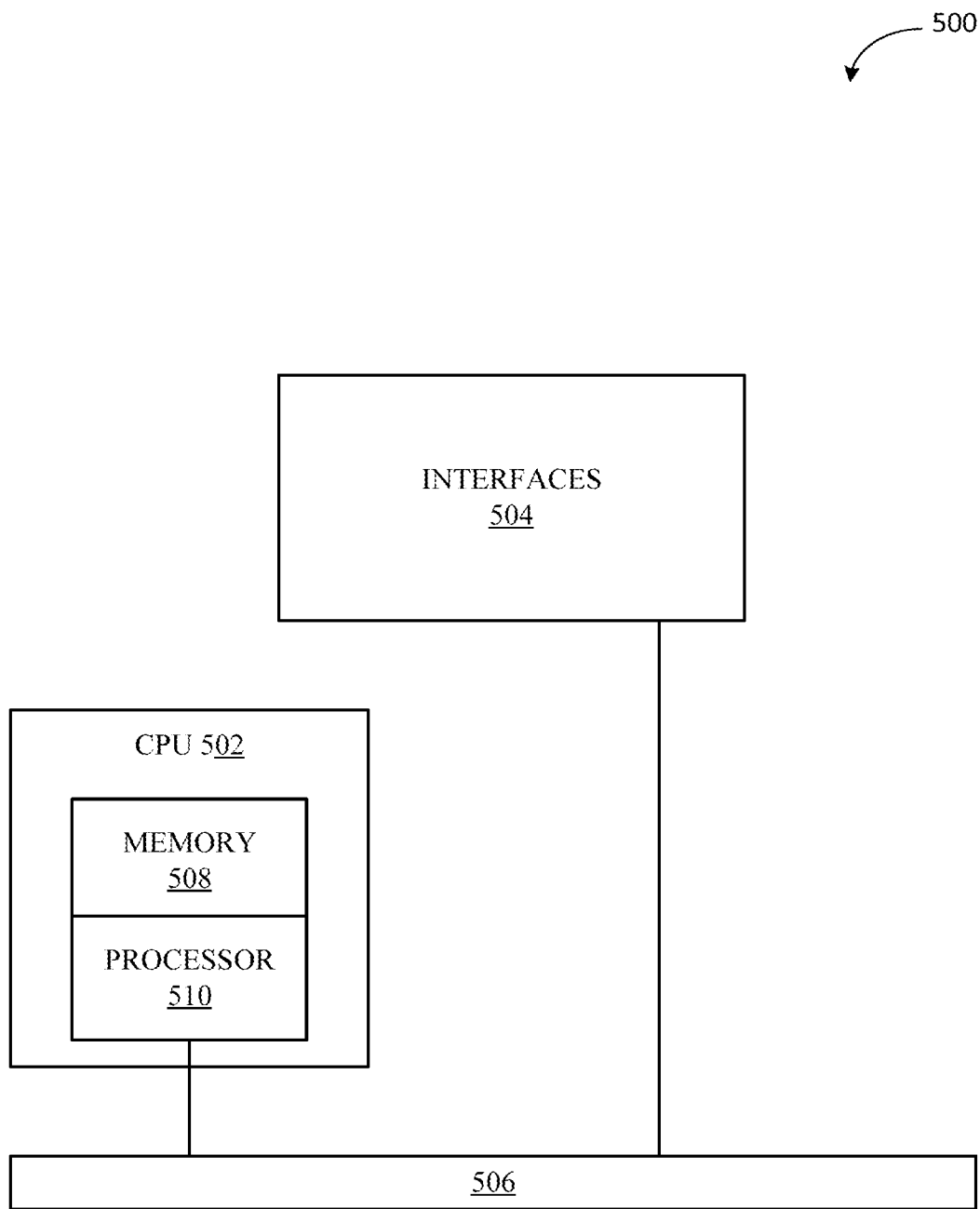
FIG. 5 illustrates an example network device, according to some examples.
Figure 6A:
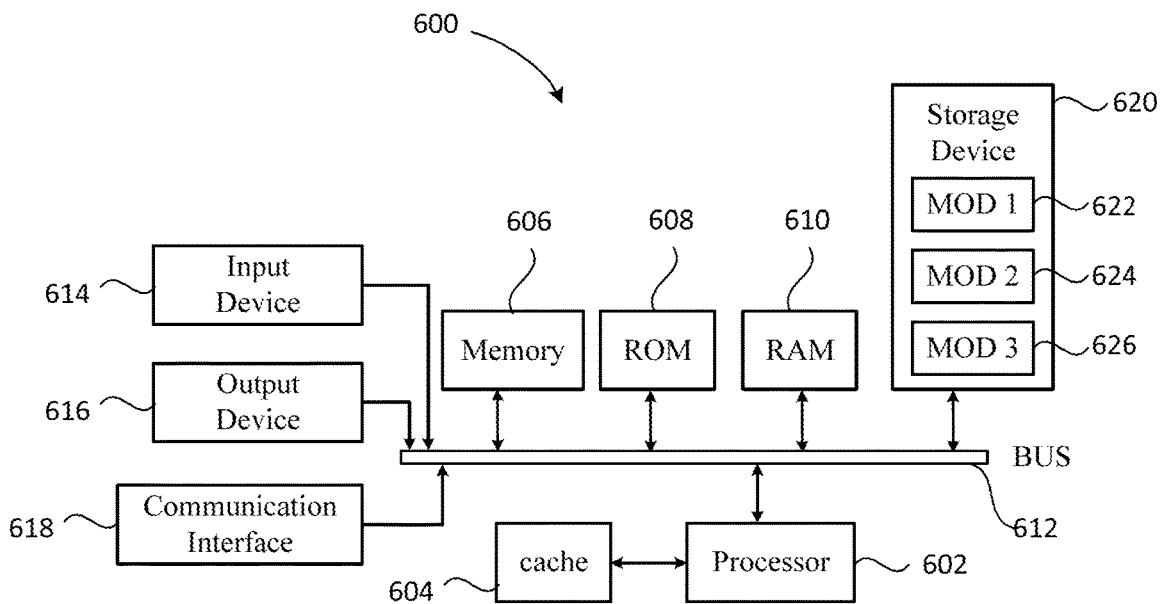
FIGS. 6A and 6B illustrate example system examples.
Figure 6B:
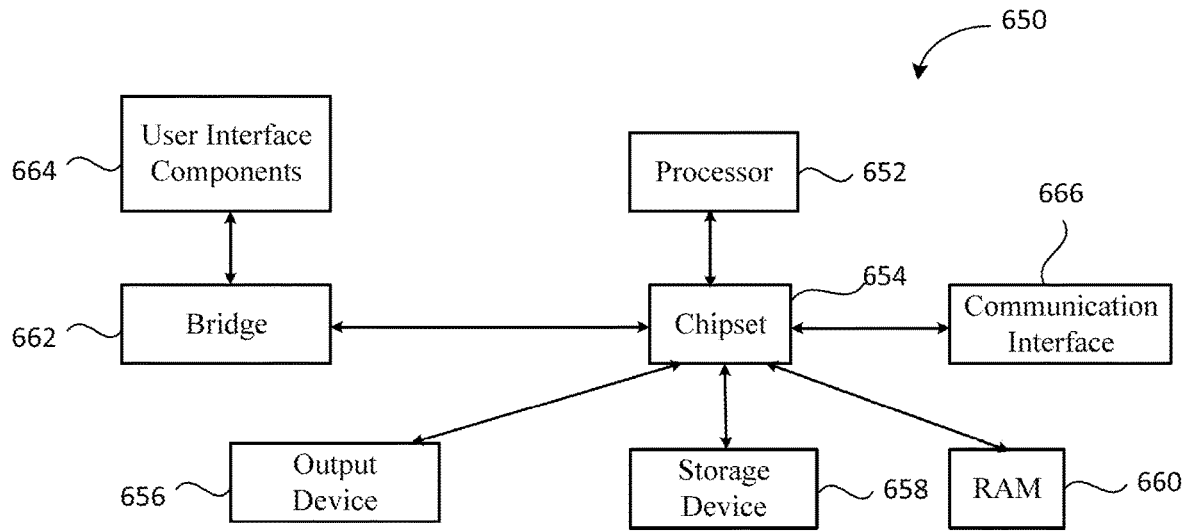

The disclosed technology addresses the need in the art for determining a packet's round trip time (RTT). Disclosed are systems, methods, and computer-readable storage media for determining a packet's RTT in a network based on information collected by a plurality of sensors deployed across the network. A description of an example network environment, as illustrated in FIG. 1, is first disclosed herein. A discussion of sensors and sensor topologies in virtualized environments, as illustrated in FIGS. 2A-C, will then follow. The discussion follows with a discussion of an example range of an expected ACK sequence number, as illustrated in FIG. 3. Then, example methods practiced according to the various examples disclosed herein will be discussed, as illustrated in FIG. 4. The discussion then concludes with a description of example devices, as illustrated in FIGS. 5 and 6A-B. These variations shall be described herein as the various examples are set forth. The disclosure now turns to FIG. 1.

FIG. 1 illustrates a diagram of example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-5 ($106_{A-E}$) (collectively "106"), hypervisors 1-4 ($108_A$-$108_D$) (collectively "108"), and virtual machines (VMs) 1-5 ($110_A$-$110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, a collector 118 (further described below), an engine 120 (further described below), etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106_C$ and hypervisor $108_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include sensor 116 (also referred to as a "sensor") configured to capture network data, and report any portion of the captured data to collector 118. Sensors 116 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 118.

For example, a VM sensor can run as a process, kernel module, or kernel driver on the guest operating system installed in a VM and configured to capture data (e.g., network and/or system data) processed (e.g., sent, received, generated, etc.) by the VM. Additionally, a hypervisor sensor can run as a process, kernel module, or kernel driver on the host operating system installed at the hypervisor layer and configured to capture data (e.g., network and/or system data) processed (e.g., sent, received, generated, etc.) by the hypervisor. A server sensor can run as a process, kernel module, or kernel driver on the host operating system of a server and configured to capture data (e.g., network and/or system data) processed (e.g., sent, received, generated, etc.) by the server. And a network device sensor can run as a process or component in a network device, such as leaf routers 104, and configured to capture data (e.g., network and/or system data) processed (e.g., sent, received, generated, etc.) by the network device.

Sensors 116 can be configured to report the observed data and/or metadata about one or more packets, flows, communications, processes, events, and/or activities to collector 118. For example, sensors 116 can capture network data as well as information about the system or host of the sensors 116 (e.g., where the sensors 116 are deployed). Such information can also include, for example, data or metadata of active or previously active processes of the system, operating system user identifiers, metadata of files on the system, system alerts, networking information, etc. Sensors 116 may also analyze all the processes running on the respective VMs, hypervisors, servers, or network devices to determine specifically which process is responsible for a particular flow of network traffic. Similarly, sensors 116 may determine which operating system user(s) is responsible for a given flow. Reported data from sensors 116 can provide details or statistics particular to one or more tenants. For example, reported data from a subset of sensors 116 deployed throughout devices or elements in a tenant space can provide information about the performance, use, quality, events, processes, security status, characteristics, statistics, patterns, conditions, configurations, topology, and/or any other information for the particular tenant space.

Collectors 118 can be one or more devices, modules, workloads and/or processes capable of receiving data from sensors 116. Collectors 118 can thus collect reports and data from sensors 116. Collectors 118 can be deployed anywhere in network environment 100 and/or even on remote networks capable of communicating with network environment 100. For example, one or more collectors can be deployed within fabric 112 or on one or more of the servers 106. One or more collectors can be deployed outside of fabric 112 but connected to one or more leaf routers 104. Collectors 118 can be part of servers 106 and/or separate servers or devices (e.g., device 114). Collectors 118 can also be implemented in a cluster of servers.

Collectors 118 can be configured to collect data from sensors 116. In addition, collectors 118 can be implemented in one or more servers in a distributed fashion. As previously noted, collectors 118 can include one or more collectors. Moreover, each collector can be configured to receive reported data from all sensors 116 or a subset of sensors 116. For example, a collector can be assigned to a subset of sensors 116 so the data received by that specific collector is limited to data from the subset of sensors.

Collectors 118 can be configured to aggregate data from all sensors 116 and/or a subset of sensors 116. Moreover, collectors 118 can be configured to analyze some or all of the data reported by sensors 116. For example, collectors 118 can include analytics engines (e.g., engines 120) for analyzing collected data. Environment 100 can also include separate analytics engines 120 configured to analyze the data reported to collectors 118. For example, engines 120 can be configured to receive collected data from collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or perform any other analytics functions.

While collectors 118 and engines 120 are shown as separate entities, this is for illustration purposes as other configurations are also contemplated herein. For example, any of collectors 118 and engines 120 can be part of a same or separate entity. Moreover, any of the collector, aggregation, and analytics functions can be implemented by one entity (e.g., collectors 118) or separately implemented by multiple entities (e.g., engine 120 and/or collectors 118).

Each of the sensors 116 can use a respective address (e.g., internet protocol (IP) address, port number, etc.) of their host to send information to collectors 118 and/or any other destination. Collectors 118 may also be associated with their respective addresses such as IP addresses. Moreover, sensors 116 can periodically send information about flows they observe to collectors 118. Sensors 116 can be configured to report each and every flow they observe. Sensors 116 can report a list of flows that were active during a period of time (e.g., between the current time and the time of the last report). The consecutive periods of time of observance can be represented as pre-defined or adjustable time series. The series can be adjusted to a specific level of granularity. Thus, the time periods can be adjusted to control the level of details in statistics and can be customized based on specific requirements, such as security, scalability, storage, etc. The time series information can also be implemented to focus on more important flows or components (e.g., VMs) by varying the time intervals. The communication channel between a sensor and collector 118 can also create a flow in every reporting interval. Thus, the information transmitted or reported by sensors 116 can also include information about the flow created by the communication channel.

FIG. 2A illustrates a schematic diagram of an example sensor deployment 200 in a virtualized environment. Server 106$_A$ can execute and host one or more VMs 202$_{A-C}$ (collectively "202"). VMs 202$_{A-C}$ can be similar to VMs 110$_{A-E}$ of FIG. 1. For example, VM 1 (202$_A$) of FIG. 2A can be VM 1 (110$_A$) of FIG. 1, and so forth. VMs 202 can be configured to run workloads (e.g., applications, services, processes, functions, etc.) based on hardware resources 212 on server 106$_A$. VMs 202 can run on guest operating systems 206$_{A-C}$ (collectively "206") on a virtual operating platform provided by hypervisor 208. Each VM 202 can run a respective guest operating system 206 which can be the same or different as other guest operating systems 206 associated with other VMs 202 on server 106$_A$. Each of guest operating systems 206 can execute one or more processes, which may in turn be programs, applications, modules, drivers, services, widgets, etc. Each of guest operating systems 206 may also be associated with one or more user accounts. For example, many popular operating systems such as LINUX, UNIX, WINDOWS, MAC OS, etc., offer multi-user environments where one or more users can use the system concurrently and share software/hardware resources. One or more users can sign in or log in to their user accounts associated with the operating system and run various workloads. Moreover, each VM 202 can have one or more network addresses, such as an internet protocol (IP) address. VMs 202 can thus communicate with hypervisor 208, server 106$_A$, and/or any remote devices or networks using the one or more network addresses.

Hypervisor 208 (otherwise known as a virtual machine monitor) can be a layer of software, firmware, and/or hardware that creates and runs VMs 202. Guest operating systems 206 running on VMs 202 can share virtualized hardware resources created by hypervisor 208. The virtualized hardware resources can provide the illusion of separate hardware components. Moreover, the virtualized hardware resources can perform as physical hardware components (e.g., memory, storage, processor, network interface, etc.), and can be driven by hardware resources 212 on server 106$_A$. Hypervisor 208 can have one or more network addresses, such as an internet protocol (IP) address, to communicate with other devices, components, or networks. For example, hypervisor 208 can have a dedicated IP address which it can use to communicate with VMs 202, server 106$_A$, and/or any remote devices or networks.

Hardware resources 212 of server 106$_A$ can provide the underlying physical hardware that drives operations and functionalities provided by server 106$_A$, hypervisor 208, and VMs 202. Hardware resources 212 can include, for example, one or more memory resources, one or more storage resources, one or more communication interfaces, one or more processors, one or more circuit boards, one or more buses, one or more extension cards, one or more power supplies, one or more antennas, one or more peripheral components, etc. Additional examples of hardware resources are described below with reference to FIGS. 6 and 7A-B.

Server 106$_A$ can also include one or more host operating systems (not shown). The number of host operating system can vary by configuration. For example, some configurations can include a dual boot configuration that allows server 106$_A$ to boot into one of multiple host operating systems. In other configurations, server 106$_A$ may run a single host operating system. Host operating systems can run on hardware resources 212. In some cases, hypervisor 208 can run on, or utilize, a host operating system on server 106$_A$. Each of the host operating systems can execute one or more processes, which may be programs, applications, modules, drivers, services, widgets, etc. Each of the host operating systems may also be associated with one or more OS user accounts.

Server 106$_A$ can also have one or more network addresses, such as an internet protocol (IP) address, to communicate with other devices, components, or networks. For example, server 106$_A$ can have an IP address assigned to a communications interface from hardware resources 212, which it can use to communicate with VMs 202, hypervisor 208, leaf router 104$_A$ in FIG. 1, collectors 118 in FIG. 1, and/or any remote devices or networks.

VM sensors 204$_{A-C}$ (collectively "204") can be deployed on one or more of VMs 202. VM sensors 204 can be data and packet inspection agents or sensors deployed on VMs 202 to capture packets, flows, processes, events, traffic, and/or any data flowing into, out of, or through VMs 202. VM sensors 204 can be configured to export or report any data collected or captured by the sensors 204 to a remote entity, such as collectors 118, for example. VM sensors 204 can communicate or report such data using a network address of the respective VMs 202 (e.g., VM IP address).

VM sensors 204 can capture and report any traffic (e.g., packets, flows, etc.) sent, received, generated, and/or processed by VMs 202. For example, sensors 204 can report every packet or flow of communication sent and received by VMs 202. Such communication channel between sensors 204 and collectors 108 creates a flow in every monitoring period or interval and the flow generated by sensors 204 may be denoted as a control flow. Moreover, any communication sent or received by VMs 202, including data reported from sensors 204, can create a network flow. VM sensors 204 can report such flows in the form of a control flow to a remote device, such as collectors 118 illustrated in FIG. 1. VM sensors 204 can report each flow separately or aggregated with other flows. When reporting a flow via a control flow, VM sensors 204 can include a sensor identifier that identifies sensors 204 as reporting the associated flow. VM sensors 204 can also include in the control flow a flow identifier, an IP address, a timestamp, metadata, a process ID, an OS username associated with the process ID, and any other information, as further described below. In addition, sensors 204 can append the process and user information (i.e., which process and/or user is associated with a particular flow) to the control flow. The additional information as identified above can be applied to the control flow as labels. Alternatively, the additional information can be included as part of a header, a trailer, or a payload.

VM sensors 204 can also report multiple flows as a set of flows. When reporting a set of flows, VM sensors 204 can include a flow identifier for the set of flows and/or a flow identifier for each flow in the set of flows. VM sensors 204 can also include one or more timestamps and other information as previously explained.

VM sensors 204 can run as a process, kernel module, or kernel driver on guest operating systems 206 of VMs 202. VM sensors 204 can thus monitor any traffic sent, received, or processed by VMs 202, any processes running on guest operating systems 206, any users and user activities on guest operating system 206, any workloads on VMs 202, etc.

Hypervisor sensor 210 can be deployed on hypervisor 208. Hypervisor sensor 210 can be a data inspection agent or a sensor deployed on hypervisor 208 to capture traffic (e.g., packets, flows, etc.) and/or data flowing through hypervisor 208. Hypervisor sensor 210 can be configured to export or report any data collected or captured by hypervisor sensor 210 to a remote entity, such as collectors 118, for example. Hypervisor sensor 210 can communicate or report such data using a network address of hypervisor 208, such as an IP address of hypervisor 208.

Because hypervisor 208 can see traffic and data originating from VMs 202, hypervisor sensor 210 can also capture and report any data (e.g., traffic data) associated with VMs 202. For example, hypervisor sensor 210 can report every packet or flow of communication sent or received by VMs 202 and/or VM sensors 204. Moreover, any communication sent or received by hypervisor 208, including data reported from hypervisor sensor 210, can create a network flow. Hypervisor sensor 210 can report such flows in the form of a control flow to a remote device, such as collectors 118 illustrated in FIG. 1. Hypervisor sensor 210 can report each flow separately and/or in combination with other flows or data. When reporting a flow, hypervisor sensor 210 can include a sensor identifier that identifies hypervisor sensor 210 as reporting the flow. Hypervisor sensor 210 can also include in the control flow a flow identifier, an IP address, a timestamp, metadata, a process ID, and any other information, as explained below. In addition, sensors 210 can append the process and user information (i.e., which process and/or user is associated with a particular flow) to the control flow. The additional information as identified above can be applied to the control flow as labels. Alternatively, the additional information can be included as part of a header, a trailer, or a payload.

Hypervisor sensor 210 can also report multiple flows as a set of flows. When reporting a set of flows, hypervisor sensor 210 can include a flow identifier for the set of flows and/or a flow identifier for each flow in the set of flows. Hypervisor sensor 210 can also include one or more timestamps and other information as previously explained, such as process and user information.

As previously explained, any communication captured or reported by VM sensors 204 can flow through hypervisor 208. Thus, hypervisor sensor 210 can observe and capture any flows or packets reported by VM sensors 204, including any control flows. Accordingly, hypervisor sensor 210 can also report any packets or flows reported by VM sensors 204 and any control flows generated by VM sensors 204. For example, VM sensor $204_A$ on VM 1 ($202_A$) captures flow 1 ("F1") and reports F1 to collector 118 on FIG. 1. Hypervisor sensor 210 on hypervisor 208 can also see and capture F1, as F1 would traverse hypervisor 208 when being sent or received by VM 1 ($202_A$). Accordingly, hypervisor sensor 210 on hypervisor 208 can also report F1 to collector 118. Thus, collector 118 can receive a report of F1 from VM sensor $204_A$ on VM 1 ($202_A$) and another report of F1 from hypervisor sensor 210 on hypervisor 208.

When reporting F1, hypervisor sensor 210 can report F1 as a message or report that is separate from the message or report of F1 transmitted by VM sensor $204_A$ on VM 1 ($202_A$). However, hypervisor sensor 210 can also, or otherwise, report F1 as a message or report that includes or appends the message or report of F1 transmitted by VM sensor $204_A$ on VM 1 ($202_A$). In other words, hypervisor sensor 210 can report F1 as a separate message or report from VM sensor $204_A$'s message or report of F1, and/or a same message or report that includes both a report of F1 by hypervisor sensor 210 and the report of F1 by VM sensor $204_A$ at VM 1 ($202_A$). In this way, VM sensors 204 at VMs 202 can report packets or flows received or sent by VMs 202, and hypervisor sensor 210 at hypervisor 208 can report packets or flows received or sent by hypervisor 208, including any flows or packets received or sent by VMs 202 and/or reported by VM sensors 204.

Hypervisor sensor 210 can run as a process, kernel module, or kernel driver on the host operating system associated with hypervisor 208. Hypervisor sensor 210 can thus monitor any traffic sent and received by hypervisor 208, any processes associated with hypervisor 208, etc.

Server $106_A$ can also have server sensor 214 running on it. Server sensor 214 can be a data inspection agent or sensor deployed on server $106_A$ to capture data (e.g., packets, flows, traffic data, etc.) on server $106_A$. Server sensor 214 can be configured to export or report any data collected or captured by server sensor 214 to a remote entity, such as collector 118, for example. Server sensor 214 can communicate or report such data using a network address of server $106_A$, such as an IP address of server $106_A$.

Server sensor 214 can capture and report any packet or flow of communication associated with server $106_A$. For example, sensor 216 can report every packet or flow of communication sent or received by one or more communication interfaces of server $106_A$. Moreover, any communication sent or received by server $106_A$, including data reported from sensors 204 and 210, can create a network flow associated with server $106_A$. Server sensor 214 can report such flows in the form of a control flow to a remote device, such as collector 118 illustrated in FIG. 1. Server sensor 214 can report each flow separately or in combination. When reporting a flow, server sensor 214 can include a sensor identifier that identifies server sensor 214 as reporting the associated flow. Server sensor 214 can also include in the control flow a flow identifier, an IP address, a timestamp, metadata, a process ID, and any other information. In addition, sensor 214 can append the process and user information (i.e., which process and/or user is associated with a particular flow) to the control flow. The additional information as identified above can be applied to the control flow as labels. Alternatively, the additional information can be included as part of a header, a trailer, or a payload.

Server sensor 214 can also report multiple flows as a set of flows. When reporting a set of flows, server sensor 214 can include a flow identifier for the set of flows and/or a flow identifier for each flow in the set of flows. Server sensor 214 can also include one or more timestamps and other information as previously explained.

Any communications captured or reported by sensors 204 and 210 can flow through server $106_A$. Thus, server sensor 214 can observe or capture any flows or packets reported by sensors 204 and 210. In other words, network data observed by sensors 204 and 210 inside VMs 202 and hypervisor 208 can be a subset of the data observed by server sensor 214 on server $106_A$. Accordingly, server sensor 214 can report any packets or flows reported by sensors 204 and 210 and any control flows generated by sensors 204 and 210. For example, sensor $204_A$ on VM 1 ($202_A$) captures flow 1 (F1) and reports F1 to collector 118 as illustrated on FIG. 1. sensor 210 on hypervisor 208 can also observe and capture F1, as F1 would traverse hypervisor 208 when being sent or received by VM 1 ($202_A$). In addition, sensor 214 on server $106_A$ can also see and capture F1, as F1 would traverse server $106_A$ when being sent or received by VM 1 ($202_A$) and hypervisor 208. Accordingly, sensor 214 can also report F1 to collector 118. Thus, collector 118 can receive a report (i.e., control flow) regarding F1 from sensor $204_A$ on VM 1 ($202_A$), sensor 210 on hypervisor 208, and sensor 214 on server $106_A$.

When reporting F1, server sensor 214 can report F1 as a message or report that is separate from any messages or reports of F1 transmitted by sensor $204_A$ on VM 1 ($202_A$) or sensor 210 on hypervisor 208. However, server sensor 214 can also, or otherwise, report F1 as a message or report that includes or appends the messages or reports or metadata of F1 transmitted by sensor $204_A$ on VM 1 ($202_A$) and sensor 210 on hypervisor 208. In other words, server sensor 214 can report F1 as a separate message or report from the messages or reports of F1 from sensor $204_A$ and sensor 210, and/or a same message or report that includes a report of F1 by sensor $204_A$, sensor 210, and sensor 214. In this way, sensors 204 at VMs 202 can report packets or flows received or sent by VMs 202, sensor 210 at hypervisor 208 can report packets or flows received or sent by hypervisor 208, including any flows or packets received or sent by VMs 202 and reported by sensors 204, and sensor 214 at server $106_A$ can report packets or flows received or sent by server $106_A$, including any flows or packets received or sent by VMs 202 and reported by sensors 204, and any flows or packets received or sent by hypervisor 208 and reported by sensor 210.

Server sensor 214 can run as a process, kernel module, or kernel driver on the host operating system or a hardware component of server $106_A$. Server sensor 214 can thus monitor any traffic sent and received by server $106_A$, any processes associated with server $106_A$, etc.

In addition to network data, sensors 204, 210, and 214 can capture additional information about the system or environment in which they reside. For example, sensors 204, 210, and 214 can capture data or metadata of active or previously active processes of their respective system or environment, operating system user identifiers, metadata of files on their respective system or environment, timestamps, network addressing information, flow identifiers, sensor identifiers, etc. Moreover, sensors 204, 210, 214 are not specific to any operating system environment, hypervisor environment, network environment, or hardware environment. Thus, sensors 204, 210, and 214 can operate in any environment.

As previously explained, sensors 204, 210, and 214 can send information about the network traffic they observe. This information can be sent to one or more remote devices, such as one or more servers, collectors, engines, etc. Each sensor can be configured to send respective information using a network address, such as an IP address, and any other communication details, such as port number, to one or more destination addresses or locations. Sensors 204, 210, and 214 can send metadata about one or more flows, packets, communications, processes, events, etc.

Sensors 204, 210, and 214 can periodically report information about each flow or packet they observe. The information reported can contain a list of flows or packets that were active during a period of time (e.g., between the current time and the time at which the last information was reported). The communication channel between the sensor and the destination can create a flow in every interval. For example, the communication channel between sensor 214 and collector 118 can create a control flow. Thus, the information reported by a sensor can also contain information about this control flow. For example, the information reported by sensor 214 to collector 118 can include a list of flows or packets that were active at hypervisor 208 during a period of time, as well as information about the communication channel between sensor 210 and collector 118 used to report the information by sensor 210.

FIG. 2B illustrates a schematic diagram of example sensor deployment 220 in an example network device. The network device is described as leaf router $104_A$, as illustrated in FIG. 1. However, this is for explanation purposes. The network device can be any other network device, such as any other switch, router, etc.

In this example, leaf router $104_A$ can include network resources 222, such as memory, storage, communication, processing, input, output, and other types of resources. Leaf router $104_A$ can also include operating system environment 224. The operating system environment 224 can include any operating system, such as a network operating system, embedded operating system, etc. Operating system environment 224 can include processes, functions, and applications for performing networking, routing, switching, forwarding, policy implementation, messaging, monitoring, and other types of operations.

Leaf router $104_A$ can also include sensor 226. Sensor 226 can be an agent or sensor configured to capture network data, such as flows or packets, sent received, or processed by leaf router $104_A$. Sensor 226 can also be configured to capture other information, such as processes, statistics, users, alerts, status information, device information, etc. Moreover, sensor 226 can be configured to report captured data to a remote device or network, such as collector 118 shown in FIG. 1, for example. Sensor 226 can report information using one or more network addresses associated with leaf router $104_A$ or collector 118. For example, sensor 226 can be configured to report information using an IP assigned to an active communications interface on leaf router $104_A$.

Leaf router $104_A$ can be configured to route traffic to and from other devices or networks, such as server $106_A$. Accordingly, sensor 226 can also report data reported by other sensors on other devices. For example, leaf router $104_A$ can be configured to route traffic sent and received by server $106_A$ to other devices. Thus, data reported from sensors deployed on server $106_A$, such as VM and hypervisor sensors on server $106_A$, would also be observed by sensor 226 and can thus be reported by sensor 226 as data observed at leaf router $104_A$. Such report can be a control flow generated by sensor 226. Data reported by the VM and hypervisor sensors on server $106_A$ can therefore be a subset of the data reported by sensor 226.

Sensor 226 can run as a process or component (e.g., firmware, module, hardware device, etc.) in leaf router $104_A$. Moreover, sensor 226 can be installed on leaf router $104_A$ as a software or firmware agent. In some configurations, leaf router $104_A$ itself can act as sensor 226. Moreover, sensor 226 can run within operating system 224 and/or separate from operating system 224.

FIG. 2C illustrates a schematic diagram of example reporting system 240 in an example sensor topology. Leaf router $104_A$ can route packets of a network flow 242 between fabric 112 and server $106_A$, hypervisor $108_A$, and VM $110_A$. The network flow 242 between VM $110_A$ and leaf router $104_A$ can flow through hypervisor $108_A$ and server $106_A$. The network flow 242 between hypervisor $108_A$ and leaf router $104_A$ can flow through server $106_A$. Finally, the network flow 242 between server $106_A$ and leaf router $104_A$ can flow directly to leaf router $104_A$. However, in some cases, the network flow 242 between server $106_A$ and leaf router $104_A$ can flow through one or more intervening devices or networks, such as a switch or a firewall.

Moreover, VM sensor $204_A$ at VM $110_A$, hypervisor sensor 210 at hypervisor $108_A$, network device sensor 226 at leaf router $104_A$, and any server sensor at server $106_A$ (e.g., sensor running on host environment of server $106_A$) can send reports 244 (also referred to as control flows) to collector 118 based on packets of the network flow 242 captured at each respective sensor. Reports 244 from VM sensor $204_A$ to collector 118 can flow through VM $110_A$, hypervisor $108_A$, server $106_A$, and leaf router $104_A$. Reports 244 from hypervisor sensor 210 to collector 118 can flow through hypervisor $108_A$, server $106_A$, and leaf router $104_A$. Reports 244 from any other server sensor at server $106_A$ to collector 118 can flow through server $106_A$ and leaf router $104_A$. Finally, reports 244 from network device sensor 226 to collector 118 can flow through leaf router $104_A$. Although reports 244 are depicted as being routed separately from the network flow 242 in FIG. 2C, one of ordinary skill in the art will understand that reports 244 and the network flow 242 can be transmitted through the same communication channel(s).

Reports 244 can include any portion of the network flow 242 captured at the respective sensors. Reports 244 can also include other information, such as timestamps, process information, sensor identifiers, flow identifiers, flow statistics, notifications, logs, user information, system information, source and destination addresses, source and destination ports, protocols, etc. Some or all of this information can be appended to reports 244 as one or more labels, metadata, or as part of the packet(s)' header, trailer, or payload. For example, if a user opens a browser on VM $110_A$ and navigates to examplewebsite.com, VM sensor $204_A$ of VM $110_A$ can determine which user (i.e., operating system user) of VM $110_A$ (e.g., username "johndoe85") and which process being executed on the operating system of VM $110_A$ (e.g., "chrome.exe") were responsible for the particular network flow to and from examplewebsite.com. Once such information is determined, the information can be included in report 244 as labels for example, and report 244 can be transmitted from VM sensor $204_A$ to collector 118. Such additional information can help system 240 to gain insight into flow information at the process and user level, for instance. This information can be used for security, optimization, and determining structures and dependencies within system 240. Moreover, reports 244 can be transmitted to collector 118 periodically as the network flow 244 or successive network flows are captured by a sensor. Further, each sensor can send a single report or multiple reports to collector 118. For example, each of the sensors 116 can be configured to send a report to collector 118 for every flow, packet, message, communication, or network data received, transmitted, and/or generated by its respective host (e.g., VM $110_A$, hypervisor $108_A$, server $106_A$, and leaf router $104_A$). As such, collector 118 can receive a report of a same packet from multiple sensors.

For example, a packet received by VM $110_A$ from fabric 112 can be captured and reported by VM sensor $204_A$. Since the packet received by VM $110_A$ will also flow through leaf router $104_A$ and hypervisor $108_A$, it can also be captured and reported by hypervisor sensor 210 and network device sensor 226. Thus, for a packet received by VM $110_A$ from fabric 112, collector 118 can receive a report of the packet from VM sensor $204_A$, hypervisor sensor 210, and network device sensor 226.

Similarly, a packet sent by VM $110_A$ to fabric 112 can be captured and reported by VM sensor $204_A$. Since the packet sent by VM $110_A$ will also flow through leaf router $104_A$ and hypervisor $108_A$, it can also be captured and reported by hypervisor sensor 210 and network device sensor 226. Thus, for a packet sent by VM $110_A$ to fabric 112, collector 118 can receive a report of the packet from VM sensor $204_A$, hypervisor sensor 210, and network device sensor 226.

On the other hand, a packet originating at, or destined to, hypervisor $108_A$, can be captured and reported by hypervisor sensor 210 and network device sensor 226, but not VM sensor $204_A$, as such packet may not flow through VM $110_A$. Moreover, a packet originating at, or destined to, leaf router $104_A$, will be captured and reported by network device sensor 226, but not VM sensor $204_A$, hypervisor sensor 210, or any other sensor on server $106_A$, as such packet may not flow through VM $110_A$, hypervisor $108_A$, or server $106_A$.

Each of the sensors $204_A$, 210, 226 can include a respective unique sensor identifier on each of reports 244 it sends to collector 118, to allow collector 118 to determine which sensor sent the report. Reports 244 can be used to analyze network and/or system data and conditions for troubleshooting, security, visualization, configuration, planning, and management. Sensor identifiers in reports 244 can also be used to determine which sensors reported what flows. This information can then be used to determine sensor placement and topology, as further described below, as well as mapping individual flows to processes and users. Such additional insights gained can be useful for analyzing the data in reports 244, as well as troubleshooting, security, visualization, configuration, planning, and management.

In some examples, information of a transmission control protocol (TCP) packet sent by a component of the network can be sensed and reported by various sensors of the reporting system 240 deployed across the network. An optimal sensor of the reporting system 240 can be determined based upon data packets reported by various sensors. Sensed information of the TCP packet can be analyzed to determine a range of an expected ACK sequence number associated with the packet. Information of a subsequent TCP packet received by the component of the network can be sensed and used to determine an ACK sequence number and a receiving time of the subsequent packet received by the component. In response to determining that the ACK sequence number of the subsequent TCP packet is overlapped with the range of the expected ACK sequence number, a round trip time (RTT) of the TCP packet can be determined based upon the sensed information of the TCP packet and the sensed information of the subsequent TCP packet.

In some examples, sensed information of a TCP packet sent by a component of the network can be used to determine a sending time, a packet sequence number and a size of the packet. A range of an expected ACK sequence number associated with the TCP packet can be determined based upon the sequence number and the packet size of the TCP packet.

In some examples, TCP packets in the network can be sampled every $n^{th}$ packet to save network flow bandwidth and processing power of network-flow-analysis tools. Instead of counting TCP packets to determine a $n^{th}$ TCP packet, a network analysis system may select a specific range of TCP sequence numbers that is $1/n^{th}$ of the entire range of TCP sequence numbers (i.e., 0 to $2^{32}$), and monitor TCP packets that have sequence numbers within the specific range.

FIG. 3 illustrates a schematic diagram 300 of selectively monitoring TCP sequence numbers in a network, according to some examples. In this example, a specific sequence range 306 is selected for monitoring TCP packets in the network. Each of TCP packets 302, 304 and 308 has a packet sequence range or a specific packet sequence number. For example, the packet 308 has a packet sequence range 310. Comparing the specific sequence range 306 with packet sequence ranges of the TCP packets 302, 304 and 308, only the packet 308 has a packet sequence range that is overlapped with the specific sequence range 306. The packets 302 and 304 can be ignored. Information of the packet 308 is sensed and sampled for network analysis.

Sensed information of the TCP packet 308 can be analyzed to determine a sending component of the network, a sending time, a packet sequence number/range, and a size of the packet 308, which can be used to determine an expected acknowledgement (ACK) sequence number/range associated with the packet 308. Information of a subsequent TCP packet received by the sending component of the network can be sensed and used to determine an ACK sequence number/range and a receiving time of the subsequent packet. In response to determining that the ACK sequence number/range of the subsequent TCP packet is overlapped with the expected ACK sequence number/range, a round trip time (RTT) of the TCP packet can be determined based upon the sensed information of the TCP packet 308 and the sensed information of the subsequent TCP packet.

As one of skill in the art will appreciate, some of all of the various methods and rules—timing, degree, magnitude, graph consistency, historical data, hash function, etc.—as described in this disclosure can be used in combination. Different weights can also be assigned to different rules and methods depending on the accuracy, margin of error, etc. of each rule or method.

Having disclosed some basic system components and concepts, the disclosure now turns to the exemplary method examples shown in FIG. 4. For the sake of clarity, the methods are described in terms of system 100, as shown in FIG. 1, configured to practice the method. However, the example methods can be practiced by any software or hardware components, devices, etc. heretofore disclosed, such as system 200 of FIG. 2A, system 220 of FIG. 2B, system 240 of FIG. 2C, system 500 of FIG. 5, system 600 of FIG. 6A, system 650 of FIG. 6B, etc. The steps outlined herein are exemplary and can be implemented in any combination thereof in any order, including combinations that exclude, add, or modify certain steps.

FIG. 4 illustrates an example method 400 for determining a packet's round trip time in a network, according to some examples. It should be understood that the exemplary method 400 is presented solely for illustrative purposes and that in other methods in accordance with the present technology can include additional, fewer, or alternative steps performed in similar or alternative orders, or in parallel. The system 100 can receive, from a sensor of a plurality of sensors deployed across the network, information of a first packet sent by a component of the network, at step 402. The plurality of sensors can be configured to sense data packets moving through the network.

In some examples, the system 100 analyzes sampled data packets. For example, data packets are sampled every $n^{th}$ packet. The system 100 may select a specific range of TCP sequence numbers that is $1/n^{th}$ of the entire range of TCP sequence numbers (i.e., 0 to $2^{32}$). The system 100 can determine TCP sequence numbers of received TCP packets and analyze those TCP packets having sequence numbers within the specific range.

The system 100 can analyze the information of the first packet to determine a sending time, a packet sequence number and a packet size of the first packet, at step 404. The system 100 can further determine an expected ACK sequence number associated with the first packet based upon the sequence number and the packet size of the first packet, at step 406.

The system 100 receives information of a following packet received by the component, at step 408. The system 100 can analyze received information of the following packet to determine an ACK sequence number and a receiving time of the following packet, at step 410.

The system 100 can compare the ACK sequence number of the following packet with the expected ACK sequence number, at step 412. In response to determining that the ACK sequence number of the following packet matches the expected ACK sequence number, the system 100 can determine a round trip time (RTT) of the first packet based upon the sending time of the first packet and the receiving time of the following packet, at step 414. In some examples, the system 100 can determine a congestion level of the network based at least upon the RTT of the first packet.

In some examples, the system 100 can receive, from the plurality of sensors, information of TCP hand-shakes in the network during a specific time period. The system 100 can determine, based upon the information of TCP hand-shakes, a number of re-transmission TCP packets and new TCP packets, and a number of non-duplicative TCP packets associated with the TCP hand-shakes. The system 100 can further determine a packet loss rate of the network during the specific time period based upon the number of re-transmission TCP packets and new TCP packets and the number of non-duplicative packets.

In response to determining that the ACK sequence number of the following packet doesn't match the expected ACK sequence number, the system 100 can ignore the following packet and goes back to step 408 to receive information a next packet received by the component.

In some examples, if ACK sequence numbers of a series of packets received by the component doesn't match an expected ACK sequence number, the system 100 can generate a warning report to indicate a potentially malicious attack.

Example Devices

FIG. 5 illustrates an example network device 500 according to some examples. Network device 500 includes a master central processing unit (CPU) 502, interfaces 504, and a bus 506 (e.g., a PCI bus). When acting under the control of appropriate software or firmware, the CPU 502 is responsible for executing packet management, error detection, and/or routing functions. The CPU 502 preferably accomplishes all these functions under the control of software including an operating system and any appropriate applications software. CPU 502 may include one or more processors 510 such as a processor from the Motorola family of microprocessors or the MIPS family of microprocessors. In an alternative example, processor 510 is specially designed hardware for controlling the operations of router. In a specific example, a memory 508 (such as non-volatile RAM and/or ROM) also forms part of CPU 502. However, there are many different ways in which memory could be coupled to the system.

The interfaces 504 are typically provided as interface cards (sometimes referred to as "line cards"). Generally, they control the sending and receiving of data packets over the network and sometimes support other peripherals used with the router. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 502 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 508) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 6A and FIG. 6B illustrate example system examples. The more appropriate example will be apparent to those of ordinary skill in the art when practicing the present technology. Persons of ordinary skill in the art will also readily appreciate that other system examples are possible.

FIG. 6A illustrates a conventional system bus computing system architecture 600 wherein the components of the system are in electrical communication with each other using a bus 612. Exemplary system 600 includes a processing unit (CPU or processor) 602 and a system bus 612 that couples various system components including the system memory 606, such as read only memory (ROM) 608 and random access memory (RAM) 610, to the processor 602. The system 600 can include a cache of high-speed memory connected directly with, in close proximity to, or integrated as part of the processor 602. The system 600 can copy data from the memory 606 and/or the storage device 620 to the cache 604 for quick access by the processor 602. In this way, the cache can provide a performance boost that avoids processor 602 delays while waiting for data. These and other modules can control or be configured to control the processor 602 to perform various actions. Other system memory 606 may be available for use as well. The memory 606 can include multiple different types of memory with different performance characteristics. The processor 602 can include any general purpose processor and a hardware module or software module, such as module 1 (622), module 2 (624), and module 3 (626) stored in storage device 620, configured to control the processor 602 as well as a special-purpose processor where software instructions are incorporated into the actual processor design. The processor 602 may essentially be a completely self-contained computing system, containing multiple cores or processors, a bus, memory controller, cache, etc. A multi-core processor may be symmetric or asymmetric.

To enable user interaction with the system 600, an input device 614 can represent any number of input mechanisms, such as a microphone for speech, a touch-sensitive screen for gesture or graphical input, keyboard, mouse, motion input, speech and so forth. An output device 616 can also be one or more of a number of output mechanisms known to those of skill in the art. In some instances, multimodal systems can enable a user to provide multiple types of input to communicate with the system 600. The communications interface 618 can generally govern and manage the user input and system output. There is no restriction on operating on any particular hardware arrangement and therefore the basic features here may easily be substituted for improved hardware or firmware arrangements as they are developed.

Storage device 620 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 610, read only memory (ROM) 608, and hybrids thereof.

The storage device 620 can include software modules 622, 624, 626 for controlling the processor 602. Other hardware or software modules are contemplated. The storage device 620 can be connected to the system bus 612. In one aspect, a hardware module that performs a particular function can include the software component stored in a computer-readable medium in connection with the necessary hardware components, such as the processor 602, bus 612, display 616, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 652, representative of any number of physically and/or logically distinct resources capable of executing software, firmware, and hardware configured to perform identified computations. Processor 652 can communicate with a chipset 654 that can control input to and output from processor 652. In this example, chipset 654 outputs information to output device 656, such as a display, and can read and write information to storage device 658, which can include magnetic media, and solid state media, for example. Chipset 654 can also read data from and write data to RAM 660. A bridge 662 for interfacing with a variety of user interface components 664 can be provided for interfacing with chipset 654. Such user interface components 664 can include a keyboard, a microphone, touch detection and processing circuitry, a pointing device, such as a mouse, and so on. In general, inputs to system 650 can come from any of a variety of sources, machine generated and/or human generated.

Chipset 654 can also interface with one or more communication interfaces 666 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 652 analyzing data stored in storage 658 or 660. Further, the machine can receive inputs from a user via user interface components 664 and execute appropriate functions, such as browsing functions by interpreting these inputs using processor 652.

It can be appreciated that example systems 600 and 650 can have more than one processor 602 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other examples or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or examples, and should not be interpreted to suggest that such features or configurations cannot be combined with features or configurations described with reference to other examples, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various examples or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
   transmitting a packet from a device to a network, wherein a component in the network determines an expected acknowledgement (ACK) sequence number associated with the packet; and
   receiving a different packet at the device over the network, wherein the component in the network:
   determines an ACK sequence number of the different packet received by the device;
   determines that the ACK sequence number of the different packet does not match the expected ACK sequence number; and
   ignores the different packet when the ACK sequence number of the different packet does not match the expected ACK sequence number.

2. The method of claim 1, wherein the component in the network further generates a warning when the ACK sequence number of the different packet does not match the expected ACK sequence number, the warning being separate from the packet and the different packet.

3. The method of claim 1, further comprising:
   transmitting an additional packet from the device to the network, wherein the component in the network further:
   determines an additional expected ACK sequence number associated with the additional packet;
   determines that an additional ACK sequence number of a different additional packet matches the additional expected ACK sequence number associated with the additional packet; and
   determines a round trip time (RTT) of the additional packet based on first information of the additional packet and second information of the different packet.

4. The method of claim 3, wherein the component in the network further:
   receives third information corresponding to a transmission control protocol (TCP) handshake performed within a specific time period and associated with a TCP connection; and
   based on the third information corresponding to the TCP handshake, determines a number of at least one of re-transmission packets and new packets transmitted during the specific time period.

5. The method of claim 1, wherein the expected ACK sequence number is determined based on a third ACK sequence number of the packet and a size of the packet.

6. The method of claim 1, wherein the component in the network further:
   determines a sending time, a packet sequence number and a packet size of the packet based on packet information sensed by at least one sensor of a plurality of sensors in the network, the packet information corresponding to the packet.

7. The method of claim 6, wherein the component in the network further:
   determines a receive time of a subsequent packet received by the device; and
   determines a round trip time (RTT) of the packet based on the sending time of the packet and the receive time of the subsequent packet.

8. The method of claim 1, further comprising:
   transmitting from the device to the network a following packet based on first packet information of the following packet, wherein the component in the network:
   determines a respective ACK sequence number of the following packet based on the first packet information of the following packet; and
   in response to a determination that the respective ACK sequence number of the following packet matches a second expected ACK sequence number, determines a round trip time (RTT) of the packet based on second packet information of the packet and the first packet information of the following packet.

9. The method of claim 1, wherein the component in the network further:
   determines a congestion level of the network based at least on a round trip time (RTT) of the packet.

10. The method of claim 1, wherein the component in the network further:
- determines a number of non-duplicative packets; and
- determines a packet loss rate of the network during a time period based at least on the number of non-duplicative packets.

11. A system comprising:
one or more processors; and
a computer-readable storage medium storing instructions which, when executed by the one or more processors, cause the system to:
- transmit a packet to a network, wherein a component in the network determines an expected acknowledgement (ACK) sequence number associated with the packet; and
- receive a different packet over the network, wherein the component in the network:
  - determines an ACK sequence number of the different packet received by the system;
  - determines that the ACK sequence number of the different packet does not match the expected ACK sequence number; and
  - ignores the different packet when the ACK sequence number of the different packet does not match the expected ACK sequence number.

12. The system of claim 11, wherein the component in the network further:
- selects a range of packet sequence numbers;
- determines a packet sequence number of the packet based on packet information of the packet; and
- determines that the packet sequence number of the packet is within the range of packet sequence numbers.

13. The system of claim 11, wherein the component in the network further:
- generates a warning when the ACK sequence number of the different packet does not match the expected ACK sequence number, the warning being separate from the packet and the different packet.

14. The system of claim 11, wherein the instructions, when executed by the one or more processors, cause the system to:
- transmit an additional packet to the network, wherein the component in the network further:
  - determines an additional expected ACK sequence number associated with the additional packet;
  - determines that an additional ACK sequence number of a different additional packet matches the additional expected ACK sequence number associated with the additional packet; and
  - determines a round trip time (RTT) of the additional packet based on first information of the additional packet and second information of the different packet.

15. The system of claim 14, wherein the component in the network further:
- receives third information corresponding to a transmission control protocol (TCP) handshake performed within a specific time period and associated with a TCP connection; and
- based on the third information corresponding to the TCP handshake, determines a number of at least one of re-transmission packets and new packets transmitted during the specific time period.

16. The system of claim 11, wherein the expected ACK sequence number is determined based on an additional ACK sequence number of the packet and a size of the packet.

17. The system of claim 11, wherein the component in the network further:
- determines a sending time, a packet sequence number and a packet size of the packet based on packet information sensed by at least one sensor of a plurality of sensors in the network, the packet information corresponding to the packet;
- determines a receive time of a further packet received by the component; and
- determines a round trip time (RTT) of the packet based on the sending time of the packet and the receive time of the further packet.

18. The system of claim 11, wherein the component in the network further:
- determines a number of non-duplicative packets; and
- determines a packet loss rate of the network during a time period based at least on the number of non-duplicative packets.

19. The system of claim 11, wherein the expected ACK sequence number is determined independent of the different packet.

20. A non-transitory computer-readable medium having stored thereon instructions which, when executed by one or more processors, cause the one or more processors to:
- transmit a packet to a network, wherein a component in the network determines an expected acknowledgement (ACK) sequence number associated with the packet; and
- receive a different packet over the network, wherein the component in the network:
  - determines an ACK sequence number of the different packet received by the device;
  - determines that the ACK sequence number of the different packet does not match the expected ACK sequence number; and
  - ignores the different packet when the ACK sequence number of the different packet does not match the expected ACK sequence number.

* * * * *